US006775399B1

(12) United States Patent
Jiang (10) Patent No.: US 6,775,399 B1
(45) Date of Patent: Aug. 10, 2004

(54) ROI SEGMENTATION IMAGE PROCESSING SYSTEM

(75) Inventor: Chunsheng Jiang, Reading, MA (US)

(73) Assignee: Analogic Corporation, Peabody, MA (US)

(*) Notice: Subject to any disclaimer, the term of this patent is extended or adjusted under 35 U.S.C. 154(b) by 580 days.

(21) Appl. No.: 09/715,889

(22) Filed: Nov. 17, 2000

Related U.S. Application Data
(60) Provisional application No. 60/166,013, filed on Nov. 17, 1999.

(51) Int. Cl.[7] ................................................. G06K 9/00
(52) U.S. Cl. ...................................... 382/128; 382/173
(58) Field of Search ................................. 382/128, 132, 382/173, 190, 131; 128/922

(56) References Cited

U.S. PATENT DOCUMENTS

| | | | | |
|---|---|---|---|---|
| 5,606,587 A | * | 2/1997 | Barski et al. ................... | 378/62 |
| 5,901,240 A | * | 5/1999 | Luo et al. ..................... | 382/132 |
| 5,974,165 A | * | 10/1999 | Giger et al. .................. | 382/132 |
| 6,314,198 B1 | * | 11/2001 | Ogura .......................... | 382/132 |
| 6,353,674 B1 | * | 3/2002 | Dewaele ....................... | 382/132 |
| 2002/0028008 A1 | * | 3/2002 | Fan et al. .................... | 382/131 |

OTHER PUBLICATIONS

Senn, R.A. and L. Barski, Detection of skin line in computed radiographs for improved tone scale, Proc. SPIE, vol. 3034, pp. 1114–1122 (1997).

Seibert, J.A., Computed radiography overview, RSNA 83rd Scientific Assembly and Annual Meeting, Chicago, IL (1997).

Jang, B.K. and R.S. Gaborski, Image enhancement for computed radiographic images, Proc. SPIE, vol. 2434, pp. 278–289.

Luo, J. and R.A. Senn, Handex: a model–based system for automatic segmentation of bones from digital hand radiographs, IEEE Trans. Medical Imaging, vol. 8(1), pp. 64–69 (1997).

Dewaele, P., M. Ibison and P. Vuylsteke, A trainable rule–based network for irradiation field recognition in AGFA's ADC system, Proc. SPIE, vol. 2708, pp. 7–20 (1996).

Luo, P. and R.A. Senn, Collimation detection for digital radiography, Proc. SPIE, vol. 3034, pp. 74–85 (1997).

* cited by examiner

Primary Examiner—Leo Boudreau
Assistant Examiner—Ryan J. Miller
(74) Attorney, Agent, or Firm—McDermott, Will & Emery LL (57) ABSTRACT

An improved ROI segmentation image processing system substantially masks non-ROI image data from a digital image to produce a ROI segmented image for subsequent digital processing. The ROI segmentation image processing system is a computer-based system having a collimation subsystem configured to detect and mask out collimated regions within the image. Furthermore, a direct exposure (DE) subsystem is configured to detect and remove DE regions from the image. Holes generated in the image are filled-in to provide a resulting image with only ROI.

24 Claims, 8 Drawing Sheets

ROI SEGMENTATION IMAGE PROCESSING SYSTEM

CROSS REFERENCE TO RELATED APPLICATIONS

This application claims the benefit of priority from U.S. provisional patent application Serial No. 60/166,013 filed Nov. 17, 1999, entitled Method and System for Image Processing and Region of Segmentation from Digital Images.

FIELD OF THE INVENTION

The present invention relates to image processing systems generally. More specifically, the present invention relates to improved digital image processing through the removal of non-region of interest information.

BACKGROUND OF THE INVENTION

Computed Radiography (CR) has gained worldwide acceptance in radiology departments. CR not only provides digital radiographic image data for easy communication and storage, but also produces images with a wide dynamic range that is suitable for various exposure and diagnostic conditions. For a specific exam, however, a CR image needs to be processed digitally to show anatomical information and enhanced diagnostic details. Besides the anatomical portion of a CR image under exam, the CR image often contains collimators of different geometry and thickness such as patient monitoring devices, clothing, and/or image markers. Because the gray-level distributions of these non-anatomical objects often overlap with the gray-level distribution of the anatomy, an automatic image processing scheme may not produce the desired image quality. In addition, a CR image may also include multiple exams or views that are separated by collimators and each exam may have different gray-level distributions.

CR uses photostimulable phosphor imaging plates (IP) and associated hardware and software to acquire and display x-ray projection images. A CR system provides a significant advantage over conventional screen film system in terms of the exposure latitude (about 10,000:1) or wide dynamic range. However, the image contrast produced by a CR system is low and digital image processing is required to extract the diagnostic information from the image data by enhancing image contrast. Since the acquisition and display are separate processes in a CR system, different image processing techniques can be applied to correct for under- or over-exposures and to enhance image quality.

If an IP contains only anatomy, referred to as diagnostic regions of interest (ROI), standard image processing may be applied to produce desired image quality in an automated fashion. However, in computed radiography imaging, collimation is frequently employed to shield irrelevant body parts (i.e., not of interest) from radiation exposure as well as to present radiation scattering from x-ray opaque materials. Collimators are also applied to partition an IP plate into different views so that multiple exams can be exposed on the same IP plate. A view refers to a region on an IP plate that is not covered by the collimators. If an image contains only one exam, the view is the entire uncollimated region. If an IP plate contains more than one exam, the views are the regions that are partitioned by the collimators but not covered by any collimator. Besides collimated regions, a CR image may also contain direct exposure (DE) region, which is a region that has been directly exposed to the x-ray source without attenuation by, for example, collimators, anatomy, or markers, hardware devices, and so on. Therefore, a CR image may contain one or more collimated regions, one or more DE regions, and one or more ROIs.

In an ideal condition, each collimated region contains high intensity pixels with a uniform distribution and the DE regions contain low intensity pixels with a uniform distribution. Therefore, the collimated and the DE regions could be easily identified.

Figure 1:
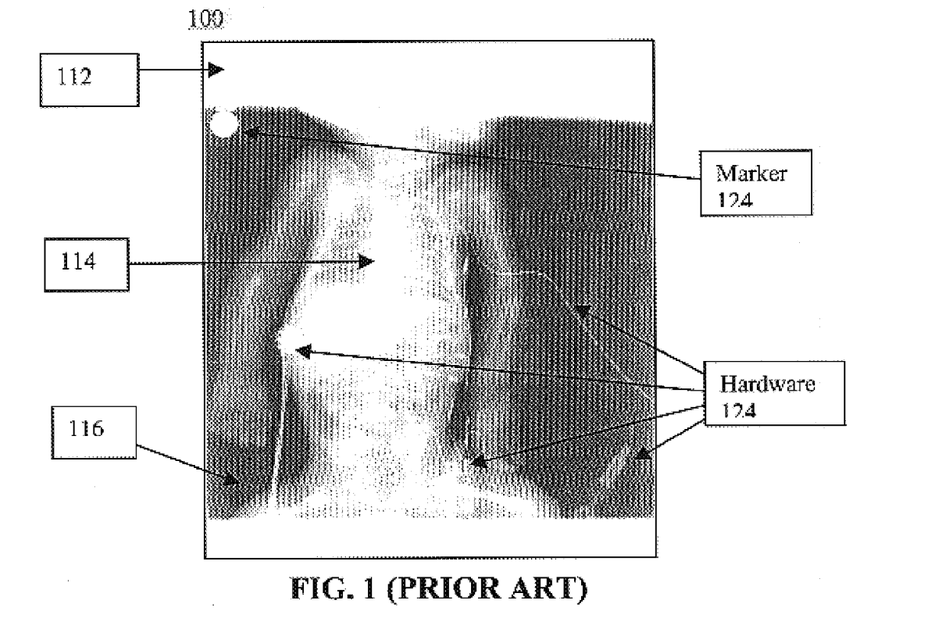
FIG. 1 is a front perspective view of a prior art single view CR image.

In a clinical setup, however, the ideal imaging setting is often not achievable and the three physically distinct regions (collimated, ROI and DE) can overlap in their distributions. FIG. 1 shows a typical prior art single view CR image 100 having collimated regions 112, ROI 114, and DE regions 116. Some pixels in collimated region 112 have lower intensity (i.e., are darker) than some pixels in the ROI 114 due to use of relatively thin collimators. Furthermore, some pixels in the DE region 116 may have higher intensity (i.e., are lighter) than the pixels in the ROI 114 due to the presence of objects 124 captured within the view, such as hardware devices for patient monitoring, cloth, air pockets, markers, hardware, and/or radiation scattering. Additionally, when a CR image has a view which is significantly skewed, processing of the ROI is extremely difficult. To compound matters, collimated and DE regions provide no useful diagnostic information and make it difficult to produce a resulting high quality, post processing ROI image, even with the use of sophisticated image processing algorithms.

Figure 2A:
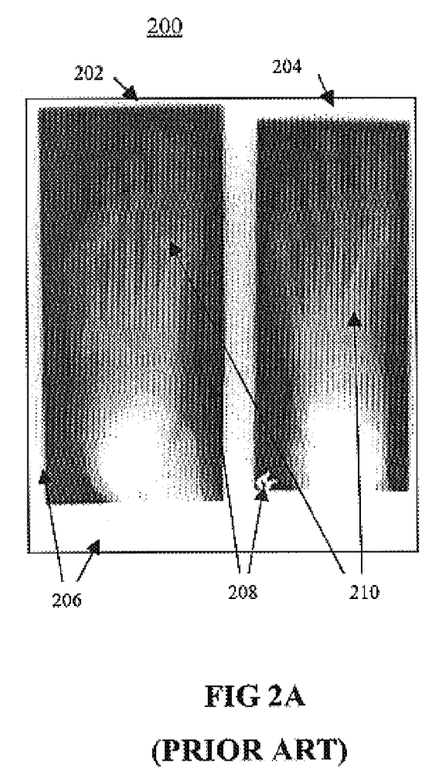
FIG. 2A is a front perspective view of a prior art CR image having multiple views and FIG. 2B is a corresponding mask produced by the ROI segmentation system of the present invention.

In the case of an IP with multiple views, such as the two human foot views 202, 204 of CR image 200 of prior art FIG. 2, a CR image will typically contain more collimated regions 206, DE regions 208 and ROIs 210 than a single view CR image. That is, each view will contain ROI 210 and DE regions 208 bounded by collimated regions 206. Because the exposure conditions and body parts for the views may vary from one exam (i.e., view) to another, the image enhancement of the CR image containing multiple views is complex. In such cases, all views of different exams need to be identified so that special image processing algorithms can be applied to each view to achieve reasonably good image quality. This processing can require human intervention and take a relatively long amount of time (e.g., several minutes or more).

SUMMARY OF THE INVENTION

The present invention is a region of interest (ROI) segmentation system and method that facilitate the isolation of ROI from other data within a digital image. The digital image may be any known type of digital image, such as a computed radiography (CR), digital radiology (DR), digital fluoroscopy (DF), nuclear medicine (NM), computer topography (CT), ultrasound, magnetic resonance (MR), or some other form of digital image. The ROI segmentation system accepts as an input a digital image that contains one or more views, wherein each view within a digital image corresponds to a different exposure. An input digital image of about 8 megabytes (and about 2000×2000 pixels) is typically processed in about 3–5 seconds, while larger images may take longer. Preferably, the input digital image includes at least about 10 percent of ROI. As an output, the ROI segmentation system produces a mask that allows generation of an image substantially void of all ancillary (i.e., non-ROI) information from each view of the original input digital image, wherein direct exposure (DE) regions such as markers and hardware devices and any collimated regions are clearly distinguished.

The ROI segmentation system includes a collimation subsystem configured to detect and remove collimated regions from an input digital image using, for the most part, boundary recognition algorithms. A collimation pre-processor module quickly detects sharp edges of collimated regions and well-defined hardware and marker images. The input image is sub-sampled using bilinear interpolation to produce a sampled digital image of about 2 MB and 1000×1000 pixels.

For edges that are less well-defined, a primary processor module accomplishes a more rigorous analysis. The collimation subsystem primary processor divides the sub-sampled digital image and averages a number of rows and columns to produce 1-dimensional averaged data. An array of the accumulated edge strength data is computed from each of the averaged row or column data. The primary processor processes each of the averaged row and column data and the edge strength data top-to-bottom and bottom-to-top and right-to-left and left-to-right to, ultimately, generate change in pixel intensity information. Using this information, the collimation subsystem primary processor determines most remaining collimated regions.

If collimated regions remain, a secondary processor which is configured to perform even greater analysis using a Hough transform-based process is implemented. Such a process may be necessary, for example, when a collimated edge is at an angle greater than 7 degrees with respect to its corresponding IP plate boundary or when the intensity distribution of the collimated regions overlaps with the other regions. The Hough transform process is implemented on edge gradient data produced by the primary processor, wherein resulting high intensity points in Hough space correspond to collimator edges.

A DE subsystem detects and removes DE regions from the input digital image, by adding them to a mask. A DE pre-processor sub-samples the input digital image and the image is smoothed with a set of gray-level morphological filters with different structural elements to remove some small objects, such as markers, tags, letters, and other hardware items. All of the views of the image are normalized by re-mapping the pixel intensities in each view to occupy a fixed intensity range determined as a function of a corresponding histogram of each view.

A DE subsystem processor generates local histograms of sub-regions, which show separation of the distributions of DE regions and ROI. The local histograms are smoothed using a moving average filter. Subsequently, a searching algorithm finds peaks corresponding to DE regions and a valley point that separates DE regions and ROI. The detected valley point is adjusted with anatomy and the adjusted value is used as a threshold value for the region. The DE sub-regions are segmented with the threshold value. Hole filling and small object removal is then performed to complete the DE segmentation.

Final verification of the collimated, ROI, and DE regions is performed and, assuming they are verified, the final mask is labeled. If all regions are not verified, an error results.

BRIEF DESCRIPTION OF THE DRAWINGS

The foregoing and other objects of this invention, the various features thereof, as well as the invention itself, may be more fully understood from the following description, when read together with the accompanying drawings, described.

For the most part, and as will be apparent when referring to the figures, when an item is used unchanged in more than one figure, it is identified by the same alphanumeric reference indicator in all figures.

DETAILED DESCRIPTION OF THE PREFERRED EMBODIMENTS

The present invention is a region of interest (ROI) segmentation system and method that facilitate the isolation of ROI from other data within a digital image. In the preferred embodiment, for illustrative purposes, the digital image is a computed radiography (CR) image, but in other embodiments the image could be a digital radiology (DR), digital fluoroscopy (DF), nuclear medicine (NM), computer topography (CT), ultrasound, magnetic resonance (MR), or some other form of digital image. The ROI segmentation system accepts as an input a digital (e.g., CR) image which contains one or more views, wherein each view within the CR image corresponds to a different radiography exposure. As an output, the ROI segmentation system produces an image substantially void of all ancillary (i.e., non-ROI) information from each view of the original input CR image, such as, direct exposure (DE) regions, markers and hardware devices, and any collimated regions are clearly distinguished.

Figure 3:
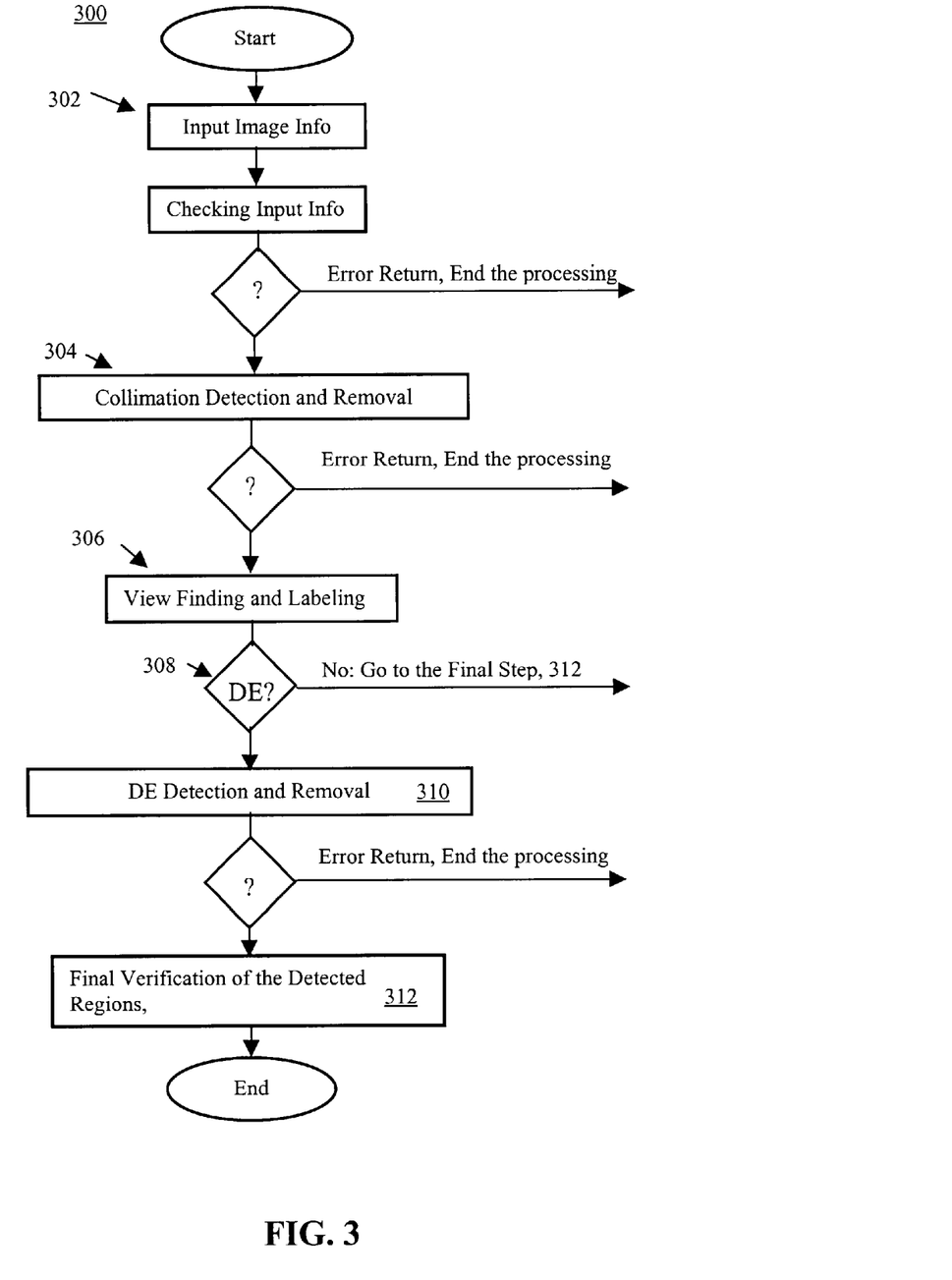
FIG. 3 is a block diagram depicting the preferred method of ROI segmentation.

A functional flow diagram 300 depicting a method for producing a ROI-only image is shown in FIG. 3. In step 302, a digital image, having one or more views, is input into the ROI segmentation system. Collimated regions are detected and removed in step 304, which allows the number of views in the image to be determined and allows those views to be labeled in step 306. If there is a determination that DE regions exist, in step 308, the DE regions are detected and removed in the step 310. In step 312, final verification of the detected regions is accomplished, any holes in the ROI are filled and a resulting mask is labeled. When the CR image is combined (digitally) with the mask, from the input digital image, only the ROI remains unmasked.

Figure 4:
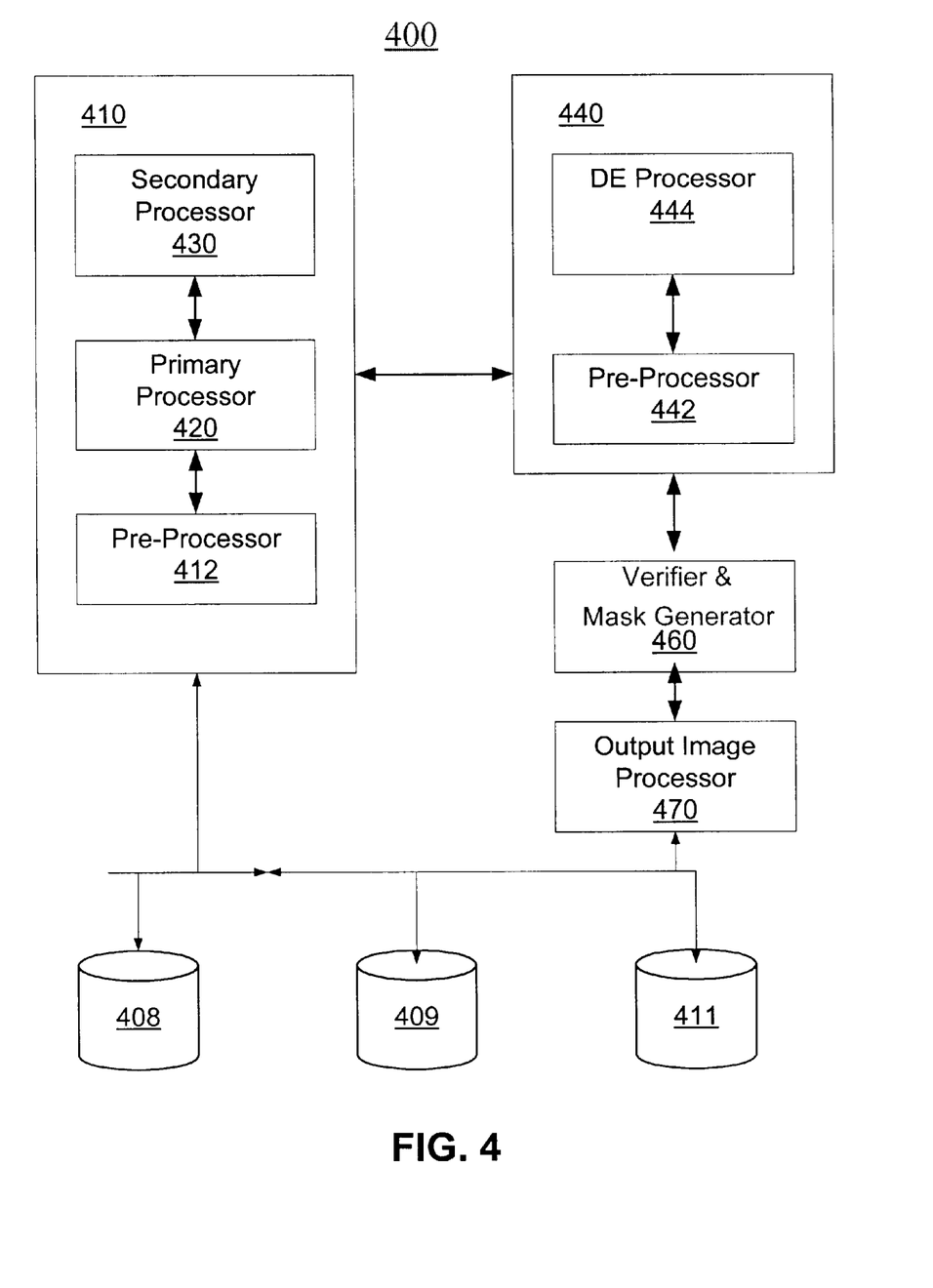
FIG. 4 is a block diagram of an architecture of a ROI segmentation system in accordance with the present invention.

A functional block diagram of one embodiment of a ROI segmentation system 400 in accordance with the present invention is shown in FIG. 4. The present invention may be implemented on any of a variety of types of computers, such as a personal computer or workstation. Also, if sufficiently configured, the present invention may be implemented on smaller portable or handheld computers, or other electronic devices. The computer may be wired or wireless and may interface with a network of computers over which data and processes may be shared or distributed. Such networks may include an intranet, the Internet and World Wide Web (the "Web"), secure networks, local area networks (LANs), wide area networks (WANs), or some combination thereof and may or may not employ encryption or other security measures.

For example, the ROI segmentation system may, in some embodiments, be accessible via the Internet and Web, wherein a party e-mails a digital image to ROI segmentation system 400, the ROI segmentation system processes the image and then returns, e.g., via e-mail, an output digital ROI image. For instance, the ROI segmentation system 400 may be accessible on-line to a hospital having an account thereon. Upon login to the ROI segmentation system 400 over the Internet and Web, the hospital may submit a digital image for processing. The ROI segmentation system 400 may then output and return a digital ROI image. When ROI segmentation system 400 is part of a network, system 400 includes a network interface.

In the preferred form, ROI segmentation system 400 operates on an input digital image initially stored in a memory 408. Memory 408 may be local, remote or distributed. An image memory buffer 409 is preferably included for interim storage of image processing data, and may be part of memory 408 or a separate memory, as shown. A rules database 411 is also provided to store a set of rules or algorithms used for processing digital images by ROI segmentation system 400. Like image buffer 409, rules database 411 may be part of memory 408 or a separate memory, as shown. As will be appreciated by those skilled in the art, the ROI segmentation system 400 may include an application program interface (API) (not shown) that provides a general interface between the ROI segmentation system application program and other applications.

Preferably, each digital image input is selectively captured and then processed with respect to relevant parameters, such as anatomy type (e.g., foot, hand, or head) and view type (e.g., front, rear, top, left side, or right side). Using the multi-view image of FIG. 2A as an example, just prior to taking CR image 200 of a foot from a top view, a radiologist may set such parameters on the CR imaging apparatus (a typical feature of such an apparatus). Selection of these parameters causes the imaging apparatus to tailor the intensities used to capture the input CR image, resulting in, typically, the best possible input CR image. The anatomy parameters are also used by ROI segmentation system 400 to tailor the intensity thresholds used for determining edges between the ROI and DE regions, and ROI and collimated regions. Consequently, when processing the input CR image and intermediate representations thereof, intensity thresholds reflect that the image being processed is a top view of a foot. These parameter types are generally known in the art and not discussed in detail herein.

In the preferred form, ROI segmentation system 400 operates on each view within a CR image (assuming multiple views) independently and may process multiple views in series or in parallel. ROI segmentation system 400 includes a collimation subsystem 410 that detects, segments, and removes existing collimated edges or regions from each view. By removal, it is meant that collimated regions are assigned a pixel value (e.g., a pixel value of 0). Each collimated region corresponds to a collimator used when initially recording the image. A collimation subsystem pre-processor module 412 quickly detects sharp edges of collimated regions and well-defined hardware and marker images. For edges that are less sharp, but still relatively well-defined, a primary processor module 420 accomplishes a more rigorous analysis than pre-processor module 412. Once a collimated region is detected, it may be segmented from the view(s). If all collimated regions are detected and segmented, processing can proceed to a DE subsystem 440 (see also step 308 of FIG. 3). Otherwise, a secondary processor module 430 within collimator detection and removal subsystem 410 is applied to detect and segment the remaining (not so well-defined) collimated region, and is particularly useful when the collimators are at a significant angle (e.g., 7 degrees or more) with respect to the edge of the IP plate on which the input CR image was recorded. The collimation subsystem 410, discussed in additional detail below, applies a set of rules stored in rules database 411 to accomplish these tasks.

Once the collimated regions are detected and segmented out, the DE subsystem 440 detects and segments substantially all DE regions within each view. The DE detection and removal subsystem 440 includes a DE pre-processor 442 and DE processor 444 which access rules database 411 during processing of a view. A verifier 450 verifies the detection results from the collimation subsystem 410 and the DE subsystem 440 using statistical and geographical (i.e., local and global) information about the detected regions. Assuming verification, a mask generator 460 uses the information from the collimation subsystem 410 and the DE subsystem 440 to generate a corresponding mask of all non-ROI data. An output image processor 470 combines the mask with the input CR image to create an output ROI image having only well-defined and distinguishable collimated regions and ROI regions. The output image processor 470 may be provided as part of the ROI segmentation system 400 or by a post processing system (not shown).

Figure 2B:
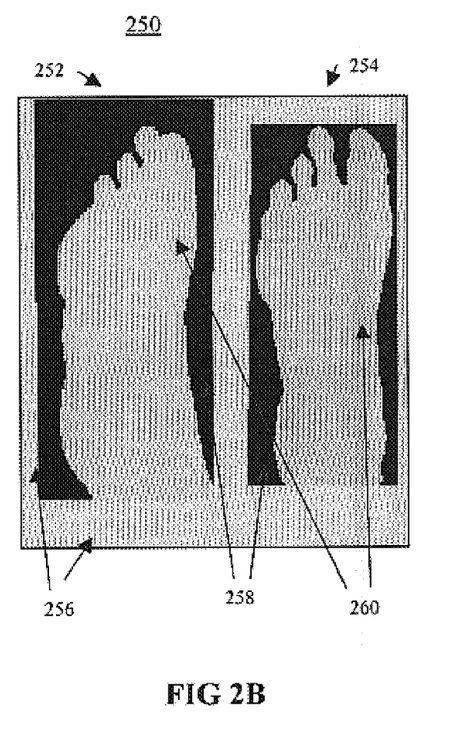

FIG. 2B shows a mask 250 generated for the CR image 200 of FIG. 2A using the ROI segmentation system of FIG. 4. As is shown, the DE regions and markers 208 of FIG. 2A have been included in a masked region of mask 250, as indicated by arrows 258, leaving a non-masked region 260 corresponding to ROI 210 of FIG. 2A. Collimated regions 206 of FIG. 2B are well defined by the masks 252 and 254 of FIG. 2B and are distinctive from ROI 260. Electronically combining masks 252 and 254 of FIG. 2B with the corresponding views 202 and 204 of FIG. 2A yields a digital image having substantially only ROI. The resulting digital ROI image is stored in memory 408 and is then ready for subsequent processing by any of a variety of known means used to derive medical diagnostic information from a digital image.

Collimated Region Detection and Removal

For the most part, in the preferred embodiment, the collimation subsystem 410 implements boundary recognition algorithms to detect and remove collimators from an input CR image having one or more views recorded on an IP plate. In the preferred form, detection and removal of collimated regions is accomplished by assigning a pixel value in a mask ultimately produced by the ROI segmentation system for all collimated regions. Of course, other pixel value assignment approaches may be used without departing from the scope of the present invention.

It is not necessary that a view within the CR image have collimator boundaries (or edges) substantially parallel to the IP plate boundaries. However, when the angle of a collimator edge is skewed with respect to the edge of the IP plate at an angel greater than a certain threshold, 7 degrees, for example, the image must be processed with the secondary processor module 430, discussed below. Additionally, each view need not contain a substantial amount of ROI to be successfully processed by the ROI segmentation system 400. In fact, a CR image may contain as little as about 10% ROI without significantly compromising the image processing of that CR image.

A typical CR image may be comprised of about 8 megabytes (MB) of digital data, representing an image about 2000×2000 pixels. Processing of such a CR image by ROI segmentation system 400 may take about 3–5 seconds, from input CR image to output ROI image. The ROI segmentation system 400 may also be configured to process larger CR images (e.g., 24 MB or more), although the processing time would likely be greater than 3–5 seconds in many instances. In the preferred form, ROI segmentation system 400 allocates a 16 bit m×n image buffer for each CR image, in buffer 409. An 8 bit mask buffer is also allocated in buffer 409. The allocated image buffer is about the size (i.e., 8 MB) of the input CR image, whereas in typical prior art systems a buffer of about three (3) times the size of the input CR image is allocated for processing an input CR image. Edges of collimated regions, corresponding to collimators used when recording the CR image, are detected as a function of the "accumulated edge strength" of the collimated regions, as described below.

Pre-processing

Using 4:1 sampling, pre-processor 412 digitally subsamples the input CR image using bilinear interpolation, such that the input CR image in sampled form ("the sampled CR image") occupies about 25% of the image buffer. Accordingly, the sampled CR image is comprised of about 2 MB of data representing a sampled image of about 1000×1000 pixels. In addition to providing a more economical (i.e., less data) representation of the input CR image, this collimated region pre-processing also allows for the detection of, at least to some extent, sharp edges of collimated regions by mean filtering the resulting sampled CR image, which strengthens the contrast between the collimated regions and other regions within the sampled CR image. The remainder of image buffer 409 is used for the storage of intermediate processing image data.

Figure 5:
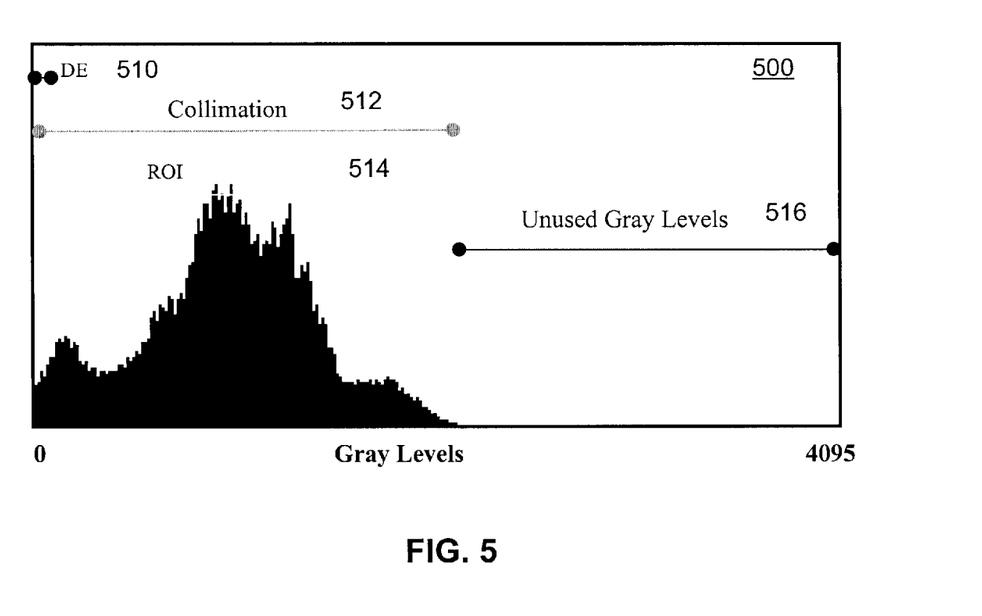
FIG. 5 is a histogram produced by the ROI segmentation system of FIG. 4.

A global histogram is produced to show the overlap in gray levels for the various regions in the CR image. For example, FIG. 5 shows a histogram 500 having DE gray levels 510, collimated region gray levels 512, and ROI gray levels 514, as well as unused gray levels 516. Histogram gray levels are used to establish threshold levels for segmenting collimated and DE regions from ROI.

Primary Processing

After pre-processing, the sampled CR image is then processed (and further sampled) by primary processor 420 of collimation subsystem 410. In the preferred embodiment the CR image is divided into thirds vertically, as demonstrated with CR image 600 of FIG. 6A, although the image may be divided up in other manners. Image 600 is used to help convey the concept of dividing and sampling a sampled CR image, but in practice the sampled CR image need not be graphically displayed. As a result of dividing a 1000× 1000 pixel image into thirds, each sampled CR image is represented by three 1000×333 (rows by columns) vertical arrays, as represented by the three regions 602, 604 and 606. The vertical arrays are searched from top-to-bottom and from bottom-to-top to find the upper and lower edges of the collimated regions (corresponding to the upper and lower collimators). Similarly, the sampled CR image is also horizontally divided into thirds, creating three 333×1000 (rows× columns) horizontal arrays. The horizontal arrays are searched from right-to-left and from left-to-right to find the right and left edges of the collimated regions (corresponding to the right and left collimators).

Figure 6A:
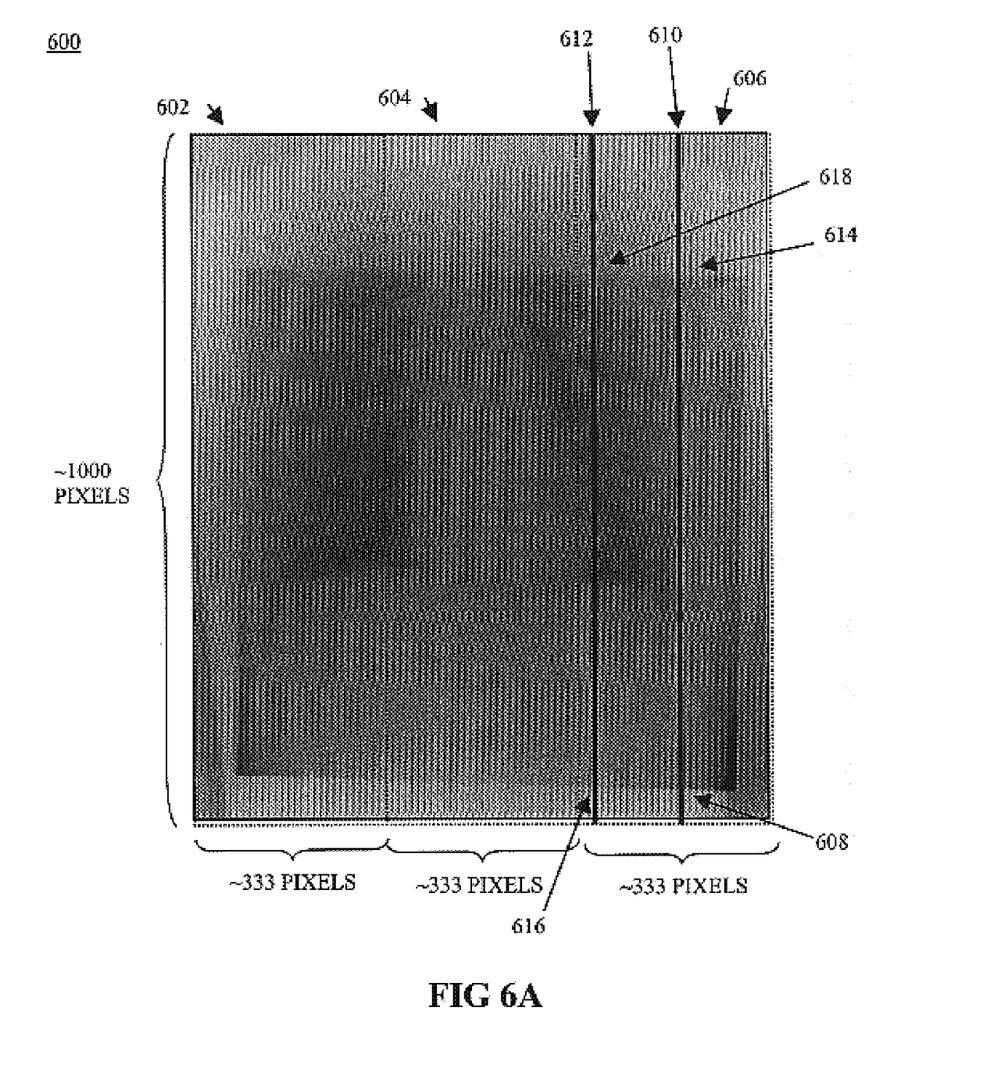
FIG. 6A is a front view of a CR image sampled by the system of FIG. 4.

Using vertical array 606 of sampled CR image 600 as an example, vertical array 606 is averaged using a series of ~333 columns of data, wherein a column is 1-dimensional data array (e.g., ~1000×1 pixels). One such averaged column, column 640 is shown in FIG. 6D. Sampling each array in a direction (e.g., top-to-bottom) refers to the order in which the data of a column, for example, is processed. Processing the same data for a column in two different directions provides different outcomes, since, at least to some extent, the data is analyzed with respect to changes in pixel intensity and those changes differ depending on the direction of traversal along a column or row.

Figure 6B:
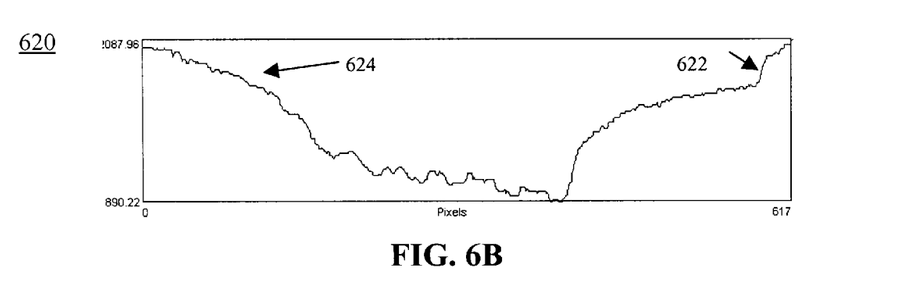
FIGS. 6B and 6C are plots of pixel intensity profiles for the two vertical lines of the CR image of FIG. 6A.

The pixel intensity plot 620 of FIG. 6B shows the intensity value for each point on column 610 of FIG. 6A, starting from the top of FIG. 6A moving to the bottom of FIG. 6A along column 610. The relatively vertical portion 622 of plot 620 represents the edge of the lower collimated region at point 608 (and corresponding collimator) in FIG. 6A The vertical rise in portion 622 demonstrates the sharp change in pixel intensity from low (i.e., dark) to high (i.e., light) in area 608 of FIG. 6A. However, portion 624 of plot 620, which corresponds to the edge of the upper collimated region at point 614, is not sharply vertical, which is consistent with the relatively small difference in pixel intensity between the view and the collimated region at point 614. Therefore, portion 624 of plot 620 is not, by itself, very useful in determining the edge of the upper collimated region.

Figure 6C:
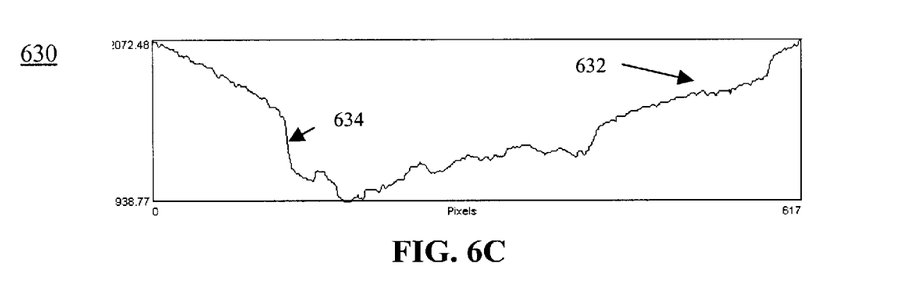
Figure 6D:
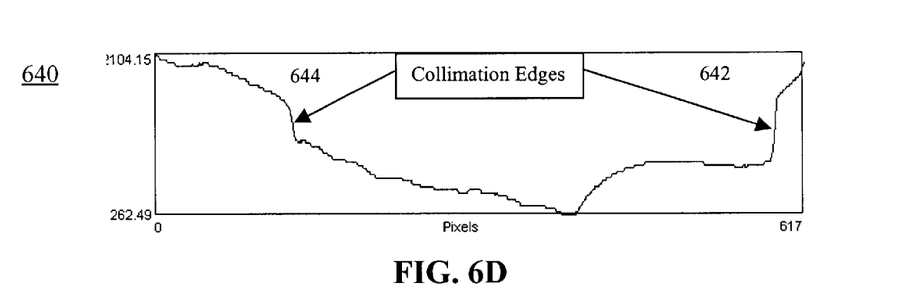
FIG. 6D is a plot of averaged pixel intensity data derived from the CR image of FIG. 6A.

Plot 630 of FIG. 6C corresponds to column 612 of FIG. 6A and, like plot 620 of FIG. 6B, is a plot of pixel intensity moving down column 612. A portion 632 of plot 630 corresponding the edge of the lower collimated region at point 616 shows a less well defined vertical rise than vertical rise 622 of FIG. 6B for the lower collimated region. This is expected since the intensity difference at point 616 of FIG. 6A is not as great as it is at point 614 for the edge of the lower collimated region. However, portion 634 of plot 630 shows a relatively well defined vertical rise (i.e., change in pixel intensity), which corresponds to point 618 in FIG. 6A. Therefore, the difference in pixel intensity around point 618 in FIG. 6A is greater than is it for point 614, yielding better detection of the edge of the upper collimated region. Data similar to that plotted in FIGS. 6B and 6C is determined for each 1-dimensional data array (i.e., column) in a given third of a sampled CR image, and for each direction (i.e., top-to-bottom and bottom-to-top for columns of data).

To compute the accumulated edge strength, the 1-dimensional data for a given third of the sample CR image is averaged, yielding the averaged 1-dimensional data plot 640 of FIG. 6D. As an example, there will be approximately 333 plots like plots 620 and 630 of FIG. 6B and FIG. 6C, respectively, for any given third of a sampled CR image, each plot having about 1000 pixels of data. The first pixel of each plot is summed and divided by the number of pixels summed (i.e. ~333 pixels) to arrive at an average 1-dimensional point of data for the first pixel in plot 640. This averaging process is continued for each pixel. Given that a third of the scanned CR image has a×b (1000×333) pixels of data, plot 640 of averaged intensity P(a) is arrived at with the following equation:

$$P(a)=[[\Sigma(p(a, b)), \text{ for } b=1 \text{ to } 333]/333], \text{ for } a=1 \text{ to } 1000$$

As shown in the intensity pixels plot 640 of FIG. 6D, the averaged one-dimensional data has stronger edge strength on both sides, shown by arrows 642 and 644.

Figure 6E:
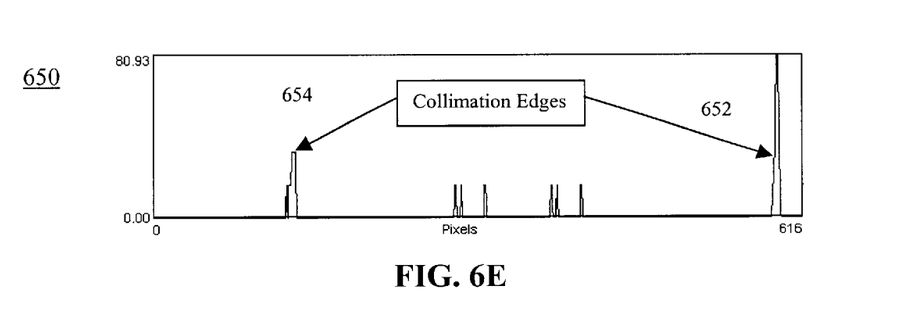
FIG. 6E is a plot of the edge strength data derived from the CR image of FIG. 6A.

The accumulated edge strength is then computed as the gradient of the averaged one-dimensional data, and is shown in the plot 650 of FIG. 6E. As is evident from FIG. 6E, determining the gradient of the averaged 1-dimensional data significantly strengthens the contrast between the collimated and DE regions, or between the collimated region and the ROI, due to the orientation of the collimators, i.e. the collimators are nearly straight and the collimators are either nearly parallel or nearly perpendicular to a border of the IP plate on which the images are recorded. The primary processor 420 can effectively identify and segment each collimated region from surrounding ROI and DE regions when each collimator is arranged to be within 7 degrees (in the preferred embodiment) of its corresponding IP plate borders. The averaging also effectively suppresses ROI and DE region edge components because the edges within the ROI and DE regions appear in a more random fashion than those of the collimators, as can be appreciated from FIG. 6A, so their impact tends to be muted by the averaging process.

The statistics of both averaged data (e.g., see FIG. 6D) and the edge strength data (e.g., see FIG. 6E) are calculated and then used in a rules-based searching routine to determine whether collimators have been correctly detected. The searching routine is implemented to search the peaks in the edge strength data (FIG. 6E) from left-to-right and from right-to-left in order to find the collimation edges. The averaged data (FIG. 6D) are then used to verify detected peaks, wherein a correlation between the edges 642 and 644 of FIG. 6D with the edges 652 and 654, respectively, of FIG. 6E serve as the basis of the verification of the detection of collimators. That is, the statistics of both averaged data and edge strength data, along with image parameter information (e.g., the anatomy and projection parameters previously discussed), are used by the searching routine to determine whether or not a collimator region has been detected. Specifically, these parameters are used to determine intensity thresholds to be applied in the detection and search routines. Additionally, based on the number of collimators detected, a determination of the number of views in a CR image being processed is determined. For example, in a single view case, the number of detected collimators should be greater than or equal to zero and less than five.

Secondary Processing

If all collimators have not been detected by the preprocessor 412 and primary processor 420, a secondary, more detailed and intensive, processing is then performed by a secondary processor 430. As examples, secondary processing is applied to images if their collimators are skewed greater than 7 degrees or if the intensity differences between collimated regions and the ROI is relatively small.

Figure 7:
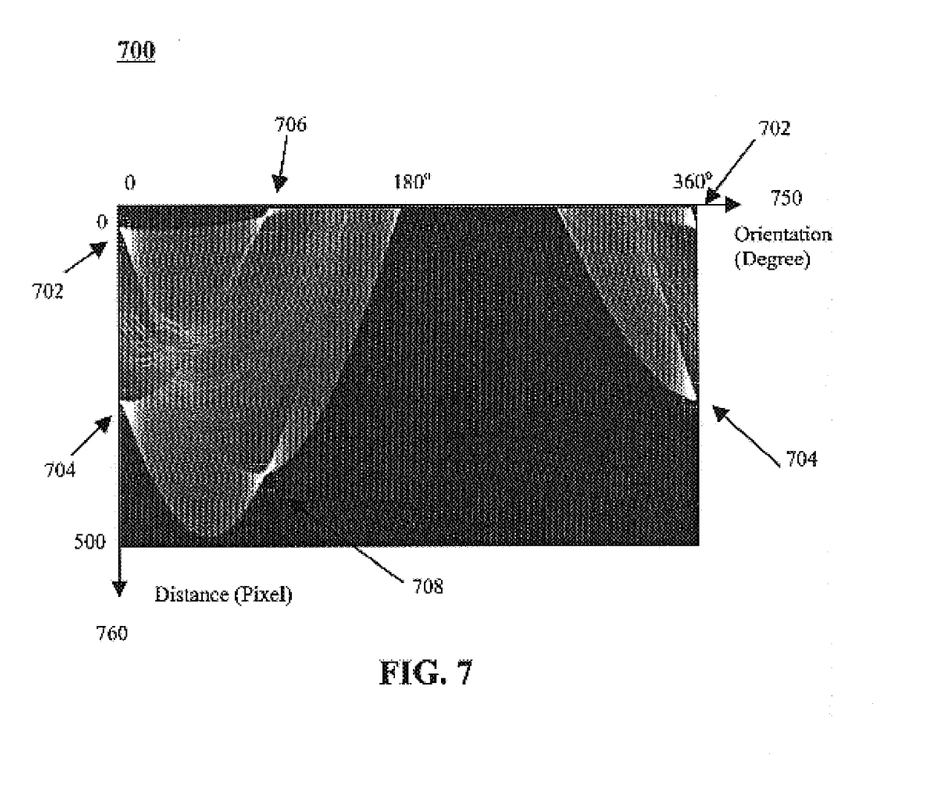
FIG. 7 is a Hough Transform plot corresponding to the CR image of FIG. 3.

In the preferred form, a collimator detector #2 of secondary processor 430 employs a Hough Transform-based process on the sampled CR image data. This process can resolve relatively small differences in intensity and process any angular degree of skew of collimators, such as beyond 7 degrees. Applying the Hough Transform-based process, a linear element in the image plan is mapped to a point in Hough space, as is shown in FIG. 7. Hough space is a polar parameter space with, in FIG. 7, orientation in degrees on a first axis 750 and distance in pixels on a second axis 760. The stronger the line is in the image plan, i.e., in length and contrast, the higher the intensity of a corresponding point in Hough space.

To arrive at FIG. 7, a Hough transform was performed on the edge gradient image that is obtained using the Sobel edge operator, wherein the collimated region edges appear as strong linear elements. Morphological image processing was applied to remove some thin edges and smooth some edge noise without weakening the overall contrast of the collimation edge. To increase the speed of the secondary processing, the original edge gradient image is sub-sampled by secondary processor 430, which effectively suppresses the linear components within the ROI (e.g. long bones or implants) and DE regions (e.g. hardware, such as tubes and wires). Consequently, the relative strengths of the collimated region edges in the Hough space are enhanced, making detection easier.

To find the collimated region edge points, the Hough space in FIG. 7 is searched from left-to-right and from top-to-bottom. The first relatively high intensity point corresponds to the strongest collimated region edge, the next relatively high intensity point corresponds to the next collimated region edge, and so forth until the last relatively high intensity point corresponding to a collimated edge is detected. Since the pixel intensities around the detected edge point in the Hough space may be greater than the pixel intensity of the next edge point. Therefore, to avoid confusion, the pixels neighboring each detected edge point are removed by secondary processor 430. The removal improves the likelihood of locating only the true edge points during a subsequent searching process. The edge strength and the intensity distribution on the left and right side of each detected edge point determine whether a detected edge point corresponds to a collimated region edge. In FIG. 7, points 702, 704, 706 and 708 correspond to collimated region edges.

After detection, collimated region edges are then verified by secondary processor 430, which implements, in the preferred embodiment, the following rules:

1) Image intensity distributions of the collimated and view regions, e.g. the mean intensity of the collimated regions, should be more than 50% of the mean intensity of the viewing region.
2) The total collimated area on the IP should be larger than 3% of the total IP area and total collimated area on the IP should be less than 90% of the total IP area.
3) Collimated regions are always outside the viewing area and no collimated region covers the center of the IP for the single view case.

After all collimated region edges are detected and verified, the regions outside of the detected collimated region edges are labeled as the collimated regions.

DE Subsystem

Similar to the collimated regions and collimation subsystem 410 discussed above, a DE subsystem 440 (see FIG. 4) detects and removes DE regions from the digital image. Detection and removal in the preferred embodiment relates to identifying DE regions in each view of an image and assigning, in a mask ultimately produced by said ROI segmentation system, a single pixel value for all DE regions detected in each view. That is, in a first view all DE regions may have the a first pixel value and in a second view all DE regions have a second pixel value, wherein the first and second pixels values may or may not be the same. Of course, other manners of assigning pixel values may also be implemented, without departing from the scope of the present invention.

As previously discussed, a DE region is a region directly exposed to radiation without attenuation. Such regions may include hardware devices and markers, as examples. Preferably, the DE removal subsystem 440 employs algorithms that produce satisfactory DE segmentation results within a limited time frame (i.e., less than five seconds for all processing steps to segment collimators, ROI, and DE). Segmenting DE allows DE regions to be removed by masking them, as in FIG. 5.

The DE detection and removal process is similar to that for detecting and removing collimated regions, i.e., detection, verification, and masking. A searching algorithm is performed to identify and label a detected view or the detected views partitioned by the collimators right before DE detection. For the image that has multiple views, processing is performed for each view independently, i.e., on a view-by-view fashion.

Pre-processing

Pre-processing is accomplished by a DE pre-processor 442. To begin, an input image (e.g., a CR image) is sub-sampled at 4:1 to increase processing speed. The digital image is smoothed with a set of gray-level morphological filters with different structuring elements to remove some small objects such as markers, tags, letters, and hardware, as is known in the art. All views in an input image are normalized (or scaled) by re-mapping the pixel intensities in each view to occupy a fixed intensity range based on minimum and maximum intensity levels detected on a histogram of each view.

The uneven image background near the collimated edges and corners is removed to improve the performance for DE removal, which greatly reduces the degree of difficulty. For example, the pixel intensity in the DE region general increases from the center to the collimated edges and corners. All subsequent image-processing steps are performed by DE processor 444 on the resulting re-scaled image with the uneven background removed.

Histogram Processing and DE Segmentation

A global histogram of the scaled CR image would typically show a large overlap between DE and ROI, with collimated regions removed. However, local histograms of sub-regions typically show adequate separation on the distributions of DE and ROI. Therefore, the scaled CR image is partitioned into sub-regions for effective DE removal. Histograms of all sub-regions in each view are computed and then smoothed with a moving average filter. A searching algorithm is used by DE processor 444 to find the peak corresponding to the DE and the valley that separates the DE from the ROI for each sub-region. The detected valley point that separates the DE from the ROI is then adjusted with anatomy (i.e., as a function of the anatomy parameter) and the adjusted value is used as a threshold for the region. All sub-regions are segmented with the adjusted thresholds.

Hole Filling and Small Object Removal

After the segmentation, binary morphological processing with a 3×3 structuring element is performed to remove some small objects outside of the ROI or in the DE region. A boundary following routine is used to find the larger holes within the ROI. If a hole in the ROI is detected, it is filled by assigning the mask value for the ROI to the pixels in the region containing the holes. A boundary following routine is also used to find the larger objects that do not belong to the ROI. If such an object is detected, it is removed by assigning the mask value determined for the DE to the detected object. The aggressiveness of DE removal is adjusted by applying a set of binary morphological operations of dilation or erosion for different body parts, which is generally known in the art.

The Final Verification and Mask Labeling

The final verification of the collimated, ROI and DE regions is performed based on the statistical and geometrical information of the detected regions. For example, DE and collimated regions enclose the ROI, collimated regions enclose the DE regions and ROI, and the intensity of the collimated and DE regions should be at least distributed separately. Statistics of each region are computed and compared to avoid possible misclassification of the regions. If the regions are mis-classified based on the final verification, an error code will be returned to inform the calling function. A boundary following routine is used to label the mask for the detected DE regions and the detected ROI's for all views in the image.

Figure 8:
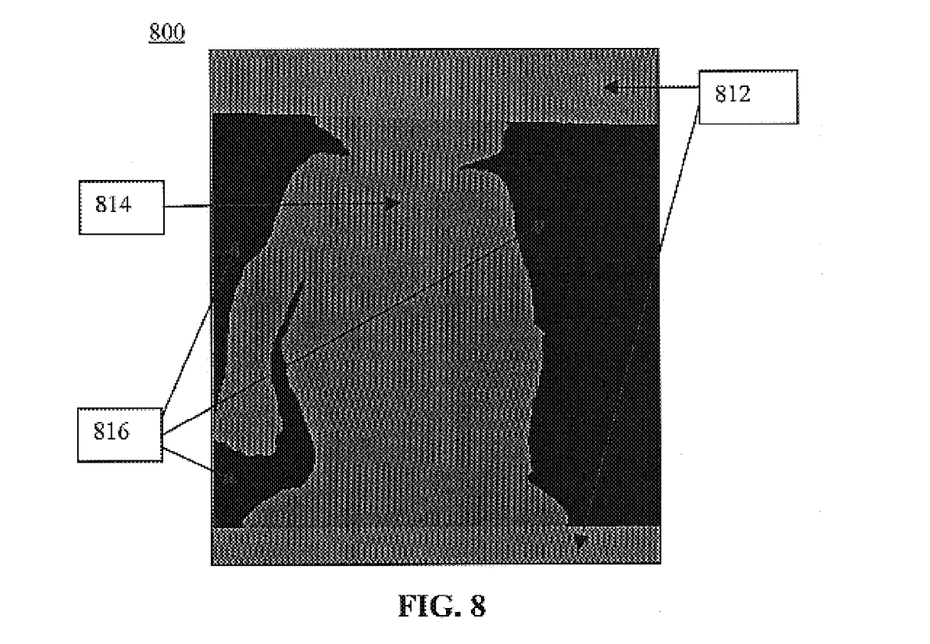
FIG. 8 is a masked produced by the ROI segmentation system of FIG. 4 for the CR image of FIG. 1.

FIG. 8 is an example of the final segmentation result in the form of a mask 800 for the single view CR image 100 of FIG. 1. Collimated regions 812 are clearly delineated, for example, with assignment of a single pixel value in the mask. DE regions 816 in the single view are represented in the mask by a single pixel value. ROI regions 814 in the mask are also represented by a pixel value (different from the pixel values used for the DE and collimated regions). As a result, when the digital image is combined with the CR image of FIG. 1, by output image processor 470, for example, only ROI 114 is left to be post processed ROI diagnostic apparatus.

The invention may be embodied in other specific forms without departing from the spirit or central characteristics thereof. The present embodiments are therefore to be considered in all respects as illustrative and not restrictive, the scope of the invention being indicated by appending claims rather than by the foregoing description, and all changes that come within the meaning and range of equivalency of the claims are therefore intended to be embraced therein.

What is claimed is:

1. A region of interest (ROI) segmentation system, comprising:
    A. at least one computer platform, having a processor and a memory associated therewith;
    B. at least one digital image stored in said memory, including at least one ROI and a set of direct exposure (DE) regions and a set of collimated regions;
    C. a ROI segmentation code, executable on said platform, said ROI segmentation code including:
        a) a collimation module, configured to detect substantially all collimated regions in said digital image and generate corresponding collimated region data;
        b) a DE module, configured to detect substantially all DE regions in said digital image and generate corresponding DE region data, wherein said DE module includes: 1) a pre-processor module, configured to digitally sample said digital image to produce a sampled image, to smooth said sampled image with a set of gray-scaled filters, and to scale said sampled image as a function of a pixel intensity range to produce a subset of said DE region data as a function thereof; and 2) a processor module, configured to parse said scaled image into sub-regions, to generate a local histogram associated with each sub-region, and to produce a subset of said DE region data as a function thereof; and
        c) a mask generation module, configured to generate, as a function of said collimated region data and said DE region data, a mask having a first-region pixel value associated with said collimated regions and at least one second-region pixel value associated with said DE regions,
    wherein said mask is configured to be combinable with said digital image to produce a ROI segmented image.

2. The system of claim 1, further comprising:
    D. a output image processor module, configured to digitally combine said mask with said digital image to produce a ROI segmented image.

3. The system as in claim 1, wherein said mask generation system is further configured to generate at least one third-region pixel value associated with said at least one ROI region.

4. The system of claim 1 wherein said digital image includes multiple views and said mask generation module is configured to generate a separate third-region pixel value associated with each of ROI regions of each view.

5. The system of claim 1 wherein said digital image contains multiple views and said ROI segmentation system is configured to identify each view and generate a subset of DE region data for each view and said mask generation module is configured to generate a separate second-region pixel value associated with the DE regions of each view.

6. The system as in claim 1, wherein said ROI segmentation system is configured to generate said mask in not more than about 5 seconds.

7. The system of claim 1 wherein said digital image is of a type chosen from a group including:
   1) computed radiography;
   2) digital radiology;
   3) digital fluoroscopy;
   4) nuclear medicine;
   5) computed topography;
   6) ultrasound; and
   7) magnetic resonance.

8. The system of claim 1, wherein said collimation module includes:
   1) a pre-processor module, configured to digitally sample said digital image to produce a sampled image and to mean filter said sampled image to produce a subset of said collimated region data as a function thereof; and
   2) a primary processor module, configured to divide and sample said sampled image to generate averaged pixel intensity data and accumulated edge gradient data to produce a subset of said collimated region data as a function thereof.

9. The system of claim 8, wherein said collimation module further includes:
   3) a secondary processor module, configured to perform a Hough Transform-based process on said edge gradient data to produce a subset of said collimated region data as a function thereof.

10. The system of claim 1, wherein said at least one computer platform is linked to and accessible via a computer network.

11. The system of claim 10, wherein said network includes the Internet.

12. The system of claim 1, wherein said at least one computer platform includes at least one of:
   1) personal computer;
   2) workstation; or
   3) handheld electronic device.

13. A method of segmenting regions of interest (ROI) from a digital image stored in a memory that is associated with a computer platform, wherein said digital image includes at least one ROI and a set of direct exposure regions and a set of collimated regions, said method comprising:
   A. detecting substantially all collimated regions in said digital image and generating corresponding collimated region data;
   B. detecting substantially all DE regions in said digital image and generating corresponding DE region data, wherein detecting said DE regions includes: 1) pre-processing said digital image, including: a) digitally sampling said digital image to produce a sampled image; b) smoothing said sampled image with a set of gray-scaled filters; and c) scaling said sampled image as a function of a pixel intensity range to produce a subset of said DE region data as a function thereof; and 2) primary processing said digital image, including: a) parsing said scaled image into sub-regions; and b) generating a local histogram associated with each sub-region to produce a subset of said DE region data as a function thereof; and
   C. generating, as a function of said collimated region data and DE region data, a mask having a first-region pixel value associated with said collimated regions and at least one second-region pixel value associated with said DE regions.

14. The method of claim 13, further comprising:
   D. combining said mask with said digital image, thereby producing a ROI segmented image.

15. The method of claim 13, further comprising:
   D. generating a third-region pixel value associated with said at least one ROI image.

16. The method of claim 13, wherein said digital image includes multiple views and said mask generating includes:
   1) generating a separate third-region pixel value associated with each of the ROI regions of each view.

17. The method of claim 13, wherein said digital image contains multiple views and detecting said collimated regions includes:
   1) identifying each view in said digital image; and detecting said DE regions includes:
   2) generating a subset of DE region data for each view; and generating said mask includes:
   3) generating a separate second-region pixel value associated with the DE regions of each view.

18. The method of claim 13, wherein said generating said mask is accomplished in not more than about 5 seconds.

19. The method of claim 13, wherein said digital image is of a type chosen from a group including:
   1) computed radiography;
   2) digital radiology;
   3) digital fluoroscopy;
   4) nuclear medicine;
   5) computed topography;
   6) ultrasound; and
   7) magnetic resonance.

20. The method of claim 13, wherein detecting said collimated regions includes:
   1) pre-processing said digital image, including:
      a) digitally sampling said digital image to produce a sampled image; and
      b) mean filtering said sampled image to produce a subset of said collimated region data as a function thereof; and
   2) a primary processing said digital image, including:
      a) dividing and sampling said sampled image to generate averaged pixel intensity data and accumulated edge gradient data to produce a subset of said collimated region data as a function thereof.

21. The method of claim 20, wherein detecting said collimated regions further includes:
   3) secondary processing said digital image, including:
      a) performing a Hough Transform-based process on said edge gradient data to produce a subset of said collimated region data as a function thereof.

22. The method of claim 13, wherein said at least one computer platform is linked to and accessible via a computer network.

23. The method of claim 22, wherein said network includes the Internet.

24. The method of claim 13, wherein said at least one computer platform includes at least one of:
   1) personal computer;
   2) workstation; or
   3) handheld electronic device.

* * * * *